United States Patent [19]

Model

[11] 4,314,938
[45] Feb. 9, 1982

[54] IMINOISOINDOLINONE PIGMENTS CONTAINING PHENYLAZOACETOACETYL-AMINOPHENYLENE GROUPS

[75] Inventor: Ernst Model, Basel, Switzerland

[73] Assignee: Ciba-Geigy Corporation, Ardsley, N.Y.

[21] Appl. No.: 158,555

[22] Filed: Jun. 11, 1980

[30] Foreign Application Priority Data

Jun. 19, 1979 [CH] Switzerland .................. 5709/79

[51] Int. Cl.³ .................... C09B 43/00; C09B 43/11; C09B 43/32; C09B 43/44
[52] U.S. Cl. .................... 260/165; 106/288 Q; 106/300; 106/308 Q; 106/309; 260/152; 260/154; 260/157; 260/193; 260/155
[58] Field of Search ............ 260/165, 157, 152, 154, 260/155

[56] References Cited

U.S. PATENT DOCUMENTS

| | | | |
|---|---|---|---|
| 3,963,694 | 6/1976 | Mory et al. | 260/154 |
| 4,012,370 | 3/1977 | Model | 260/152 |
| 4,221,709 | 9/1980 | Kawamura et al. | 260/165 |

*Primary Examiner*—Floyd D. Higel
*Attorney, Agent, or Firm*—Luther A. R. Hall

[57] ABSTRACT

The invention relates to iminoisoindolinone pigments of the formula

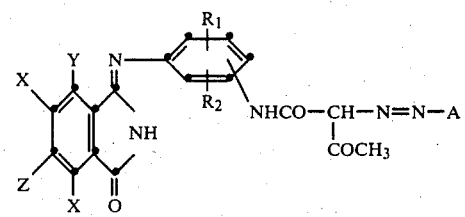

wherein X is halogen, Y and Z are halogen, $C_1$–$C_4$ alkoxy, or aryloxy, $R_1$ and $R_2$ are hydrogen, halogen, $C_1$–$C_2$ alkyl or $C_1$–$C_2$ alkoxy, and A is phenyl which can be substituted by halogen, trifluoromethyl, $C_1$–$C_2$ alkyl, $C_1$–$C_2$ alkoxy, or by a group of the formula —CONHR$_3$ or —NHCOR$_4$, wherein $R_3$ is hydrogen, $C_1$–$C_2$ alkyl, or phenyl which can be substituted by halogen, methyl, methoxy or trifluoromethyl, and $R_4$ is phenyl which can be substituted by halogen, methyl or methoxy, or is $C_1$–$C_2$ alkyl, or A is a heterocyclic radical. These pigments are distinguished by particulary excellent color strength and fastness to migration and are suitable for pigmenting organic material of high molecular weight.

7 Claims, No Drawings

IMINOISOINDOLINONE PIGMENTS CONTAINING PHENYLAZOACETOACETYL-AMINOPHENYLENE GROUPS

The present invention relates to novel iminoisoindolinone pigments of the formula

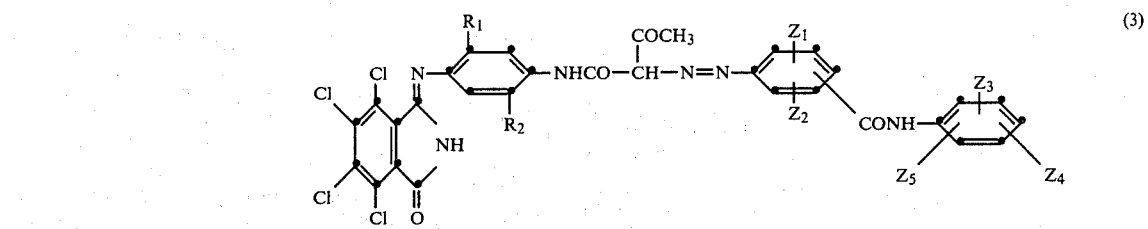
(1)

wherein X is halogen, Y and Z are halogen, $C_1$-$C_4$alkoxy, or aryloxy, $R_1$ and $R_2$ are hydrogen, halogen, $C_1$-$C_2$alkyl or $C_1$-$C_2$alkoxy, and A is phenyl which can be substituted by halogen, trifluoromethyl, $C_1$-$C_2$alkyl, $C_1$-$C_2$alkoxy, or by a group of the formula —$CONHR_3$ or —$NHCOR_4$, wherein $R_3$ is hydrogen, $C_1$-$C_2$alkyl, or phenyl which can be substituted by halogen, methyl, methoxy or trifluoromethyl, and $R_4$ is phenyl which can be substituted by halogen, methyl or methoxy, or is $C_1$-$C_2$alkyl, or A is a heterocyclic radical.

Particularly interesting pigments are those of the formula

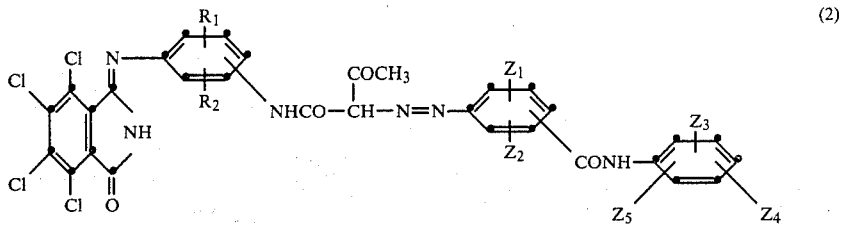
(2)

wherein $R_1$ and $R_2$ are as defined above and $Z_1$ to $Z_5$ are hydrogen, halogen or methyl, whilst one of the substituents $Z_1$ and $Z_2$ can also be methoxy and not more than two of the substituents $Z_3$ to $Z_5$ can be trifluoromethyl or methoxy; and especially those of the formula

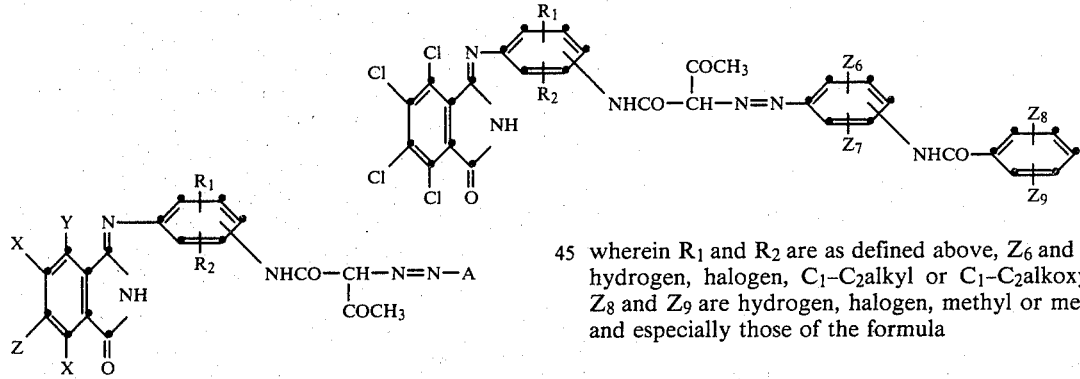
(3)

wherein $R_1$, $R_2$ and $Z_1$ to $Z_5$ are as defined above.

Interesting pigments are also those of the formula (4)

wherein $R_1$ and $R_2$ are as defined above, $Z_6$ and $Z_7$ are hydrogen, halogen, $C_1$-$C_2$alkyl or $C_1$-$C_2$alkoxy, and $Z_8$ and $Z_9$ are hydrogen, halogen, methyl or methoxy; and especially those of the formula

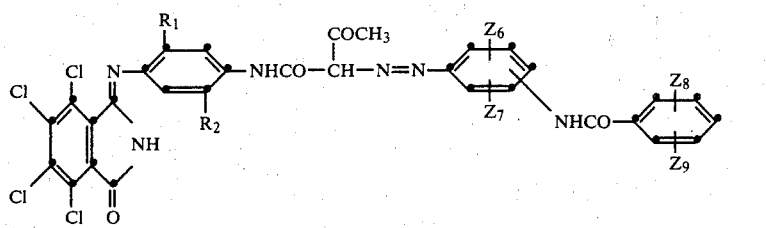
(5)

wherein $R_1$, $R_2$ and $Z_6$ to $Z_9$ are as defined above.

Further interesting pigments are also those of the formula

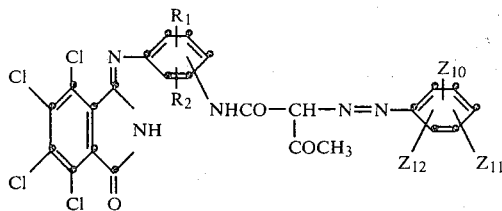

wherein $R_1$ and $R_2$ are as defined above and $Z_{10}$ to $Z_{12}$ are hydrogen, halogen, methyl, trifluoromethyl or methoxy, with the proviso that not more than two of the substituents $Z_{10}$ to $Z_{12}$ can be trifluoromethyl or methoxy; and especially those of the formula (7)

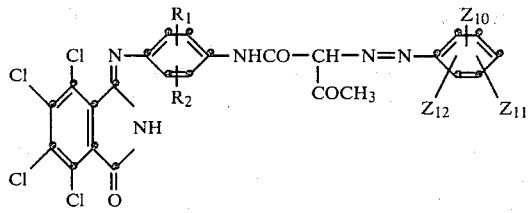

wherein $R_1$, $R_2$ and $Z_{10}$ to $Z_{12}$ are as defined above.

In the formulae 1 to 4, halogen denotes bromine or, in particular, chlorine.

As a heterocyclic radical, A can be especially benzimidazolone, preferably N-methylbenzimidazolone, chlorobenzimidazolone, methylbenzimidazolone or methoxy-benzimidazolone, as well as phenmorpholone such as 6-methylphenmorpholone, quinazoline, e.g. 2,4-dihydroxy-1,3-quinazoline, quinolone, e.g. methylquinolone, or quinazolone.

The pigments of the present invention are obtained by condensing 1 mole of an isoindoline of the formula

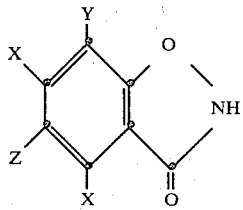

wherein X, Y and Z have the above meanings and Q is a group of the formula

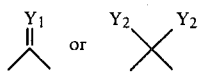

wherein $Y_1$ is an imino or thiol group, and $Y_2$ is halogen, $C_1$–$C_4$alkoxy, or a secondary amino group, with 1 mole of an amine of the formula

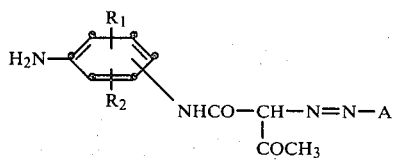

wherein $R_1$, $R_2$ and A are as defined above.

The starting materials are preferably isoindolinones of the formula

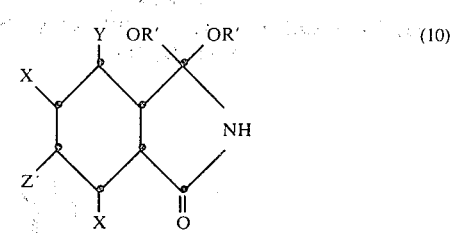

wherein each R' is $C_1$–$C_4$alkyl and X, Y and Z have the given meanings.

The preferred starting materials are isoindolinones of the formula I, wherein X, Y and Z are chlorine.

Examples of starting materials of the formula 10 are:
3-imino-4,5,6,7-tetrachloroisoindolinone
3-imino-5,7-dichloro-4,6-dimethoxyisoindolinone
3,3,4,5,6,7-hexachloroisoindolinone
3,3-dimethoxy-5,7-dichloro-4,6-dimethoxyisoindolinone
3,3-dimethoxy-4,5,7-trichloro-6-methoxyisoindolinone
3,3-dimethoxy-4,5,6,7-tetrachloroisoindolinone
3,3-dimethoxy-4,5,6,7-tetrabromoisoindolinone
3,3-dimethoxy-4,5,7-trichloro-6-ethoxyisoindolinone
3,3-dimethoxy-4,5,7-trichloro-6-n-propoxyisoindolinone
3,3-dimethoxy-4,5,7-trichloro-6-n-butoxyisoindolinone
3,3-dimethoxy-4,5,7-trichloro-6-n-phenoxyisoindolinone The above compounds are known or they can be obtained by known methods.

The above isoindolinones are condensed with the amines of the formula 9. Examples of suitable amines are:
2-chloro-5-(2',4',5'-trichlorophenylcarbamoyl)-phenylazoacetoacetyl-p-aminoanilide
2-chloro-5-(2',4'-dichlorophenylcarbamoyl)-phenylazoacetoacetyl-p-aminoanilide
2-chloro-5-(3',4'-dichlorophenylcarbamoyl)-phenylazoacetoacetyl-p-aminoanilide
2-chloro-5-(2',4'-dichlorophenylcarbamoyl)-phenylazoacetoacetyl-o-methoxy-p-aminoanilide
4-phenylcarbamoyl-phenylazo-acetoacetyl-p-aminoanilide
2-chloro-5-(2',4',5'-trichlorophenylcarbamoyl)-phenylazoacetoacetyl-m-aminoanilide
benzimidazol-5-yl-azo-acetoacetyl-p-aminoanilide
3-(4'-chlorobenzoylamido)-phenylazo-acetoacetyl-p-aminoanilide
4-(4'-chlorobenzoylamido)-phenylazo-acetoacetyl-p-aminoanilide
4-acetylamido-phenylazo-acetoacetyl-p-aminoanilide
3-acetylamido-phenylazo-acetoacetyl-p-aminoanilide
3,4-dichlorophenylazo-acetoacetyl-p-aminoanilide
4-chlorophenylazo-acetoacetyl-p-aminoanilide The amines specified above are known or they can be obtained by known methods, e.g. by diazotisation of an amine of the formula $ANH_2$ and coupling with an acetoacetylnitroaniline and reduction of the nitro group in the resultant azo colourant.

Where 3-imino-, 3-thio- or 3,3-bis-sec-amino-4,5,6-tetrachloroisoindolin-1-ones or alkali salts of 3,3-dialkoxy-4,5,6,7-tetrachloroisoindolin-1-ones are used as starting materials for obtaining the pigments of formula 1, then it is advantageous to use watermiscible organic solvents, e.g. lower aliphatic alcohols such as lower alkanols, for example methanol, isopropanol or butanol, or lower aliphatic ketones such as acetone. In doing so, the condensation is able to take place even at relatively low temperatures. It is advantageous to perform the reaction in the presence of an agent binding alkali and organic bases, for example a lower fatty acid which can be used simultaneously as solvent, especially acetic acid.

If the starting material is a 3,3-dihalogeno-4,5,6,7-tetrachloroisoindolin-1-one it is preferred to use an organic solvent that does not contain hydroxyl groups, for example an aromatic hydrocarbon such as benzene, toluene, xylene, tetrahydronaphthalene or diphenyl; a cycloaliphatic hydrocarbon, for example cyclohexane; a halogenated aliphatic hydrocarbon, for example carbon tetrachloride or tetrachloroethylene, or a halogenated aromatic hydrocarbon, for example chlorobenzene or a di- and trichlorobenzene; also a nitrohydrocarbon, for example nitrobenzene; an aliphatic ether, for example dibutyl ether; an aromatic ether, for example diphenyl ether, or a cyclic ether, for example dioxane; also a ketone, for example acetone; or an ester, for example an ester of a lower fatty acid with a lower alkanol, for example ethyl acetate, in the presence of an acid acceptor.

The pigments of the formula I can also be obtained by diazotising 1 mole of an amine of the formula $$ANH_2 \qquad (11)$$

and coupling the diazonium compound with 1 mole of a compound of the formula

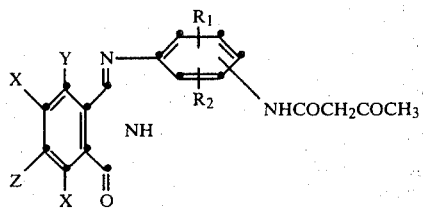

wherein A, X, Y, Z, $R_1$ and $R_2$ have the given meanings.

Directly after their formation the pigments of the present invention fall out of the reaction medium. For certain purposes they can be used direct as crude pigments; but their properties, especially with respect to purity, form, and hiding power, can also be improved by known methods, for example by extraction with organic solvents or by grinding with grinding assistants which can afterwards be removed, for example salts, or by precipitation with an alkali.

The novel compounds are useful pigments which, in finely dispersed form, can be used for pigmenting organic material of high molecular weight, for example cellulose ethers and esters, such as ethyl cellulose, acetyl cellulose, nitrocellulose, polyamides and polyurethanes or polyesters, natural resins or synthetic resins, such as polymerisation or condensation resins, for example aminoplasts, in particular urea/formaldehyde and melamine/formaldehyde resins, alkyd resins, phenolic plastics, polycarbonates, polyolefins, such as polystyrene, polyvinyl chloride, polyethylene, polypropylene, polyacrylonitrile, polyacrylates, thermoplastic or curable acrylic resins, rubber, casein, silicon and silicone resins, singly or in mixtures.

It is immaterial whether the specified materials of high molecular weight are in the form of plastics, melts or of spinning solutions, lacquers, paints or printing inks. Depending on the use to which they are put, it is advantageous to use the new pigments as toners or in the form of preparations.

The colourations obtained are characterised by high colour strength, great clarity of shade, good fastness to overstripe bleeding, light, heat, migration and atmospheric influences.

The invention is illustrated by the following Examples, in which percentages are by weight.

EXAMPLE 1

13 g of 3,4,5,6-tetrachloro-o-cyanobenzoic acid methyl ester are stirred with 43.2 ml of a 1 N sodium methylate solution in methanol until a clear solution is obtained. The sodium salt of 3,3-dimethoxy-4,5,6,7-tetrachloroisoindolin-1-one forms. With efficient stirring, 19.4 g of finely ground and sieved 2-chloro-5-(2',4'-dichlorophenylcarbamoyl)-phenylazo-acetoacetyl-p-aminoanilide, 150 ml of o-dichlorobenzene and 25 ml of dimethyl formamide are then added. At a bath temperature of 120° C., the internal temperature is raised in the course of 1 hour to 100° C. while distilling off methanol, whereupon the sodium salt of the pigment precipitates without a clear solution having formed. The batch is diluted with a further 100 ml of o-dichlorobenzene and kept for 3 hours at 100° C. After acidification with 15 ml of glacial acetic acid, the temperature is raised to 140°–150° C. and kept for 2 hours with efficient stirring. The insoluble pigment is collected by filtration at 120° C. and washed with methanol, acetone and water and then dried, affording 26.3 g of a productive yellow pigment which, in this form, or after it has been ground by one of the conventional methods, can be used for colouring plastics and for the preparation of printing pastes and lacquers. The yellow colourations obtained are distinguished by outstanding fastness properties.

In the following Examples 2 to 44, the 2-chloro-5-(2',4'-dichlorophenylcarbamoyl)-phenylazo-acetoacetyl-p-aminoaniline employed in Example 1 is replaced by compounds of the general formula

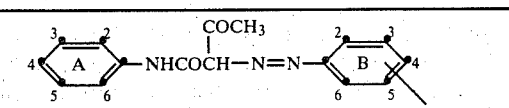

| No. | A | B | R | Shade |
|---|---|---|---|---|
| 2 | 4-NH₂—2-Cl— | 4-CONH— | H | yellow |
| 3 | 4-NH₂— | 4-CONH— | CH₃ | yellow |
| 4 | 4-NH₂—2-Cl | 4-CONH— | CH₃ | yellow |
| 5 | 3-NH₂— | 4-CONH— | 3,4-di-Cl—phenyl- | greenish yellow |
| 6 | 3-NH₂— | 3-CONH—4-Cl— | 2,4-di-Cl—phenyl- | greenish yellow |

-continued

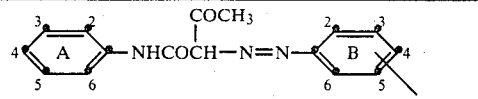

| No. | A | B | R | Shade |
|---|---|---|---|---|
| 7 | 3-$NH_2$— | 3-CONH—4-Cl | 3,4-di-Cl—phenyl- | greenish yellow |
| 8 | 3-$NH_2$— | 3-CONH—4-Cl— | 2,4,5-tri-Cl—phenyl | greenish yellow |
| 9 | 3-$NH_2$— | 3-CONH—4-Cl— | 2-$CH_3$—5-Cl—phenyl- | greenish yellow |
| 10 | 3-$NH_2$— | 3-$CH_3$—4-CONH— | 4-Cl—phenyl | greenish yellow |
| 11 | 3-$NH_2$—6-Cl | 3-CONH—4-Cl— | 2,4-di-Cl—phenyl- | greenish yellow |
| 12 | 3-$NH_2$—6-$CH_3$ | 4-Cl—3-CONH— | 2,4-di-Cl—phenyl- | yellow |
| 13 | 4-$NH_2$— | 4-CONH— | 3,4-di-Cl—phenyl- | greenish yellow |
| 14 | 4-$NH_2$— | 4-Cl—3-CONH— | 3,4-di-Cl—phenyl- | greenish yellow |
| 15 | 4-$NH_2$— | 4-Cl—3-CONH— | 2,4,5-tri-Cl—phenyl- | yellow |
| 16 | 4-$NH_2$— | 4-Cl—3-CONH | 2-$CH_3$—3-Cl—phenyl- | yellow |
| 17 | 4-$NH_2$— | 4-Cl—3-CONH— | 2-$CH_3$—5-Cl—phenyl- | yellow |
| 18 | 4-$NH_2$— | 3-$CH_3$—4-CONH— | 4-Cl—phenyl- | greenish yellow |
| 19 | 4-$NH_2$—2-Cl | 4-CONH— | 3,4-di-Cl—phenyl- | yellow |
| 20 | 4-$NH_2$—2-Cl | 4-Cl—3-CONH— | 2,4-di-Cl—phenyl- | yellow |
| 21 | 4-$NH_2$—2-Cl | 4-Cl—3-CONH— | 3,4-di-Cl—phenyl- | yellow |
| 22 | 4-$NH_2$—2-Cl | 4-Cl—3-CONH— | 2,4,5-tri-Cl—phenyl | yellow |
| 23 | 4-$NH_2$—2-Cl | 4-Cl—3-CONH— | 3-trifluoromethyl-4-chlorophenyl- | yellow |
| 24 | 4-$NH_2$—2-Cl | 4-Cl—3-CONH— | 2-$CH_3$—3-Cl—phenyl- | yellow |
| 25 | 4-$NH_2$—2-Cl | 4-Cl—3-CONH— | 2-$CH_3$—5-Cl—phenyl- | yellow |
| 26 | 4-$NH_2$—2-Cl— | 3-$CH_3$—4-CONH— | 4-Cl—phenyl- | yellow |
| 27 | 4-$NH_2$—2,5-di-Cl | 4-Cl—3-CONH— | 2,4-di-Cl—phenyl- | yellow |
| 28 | 4-$NH_2$—2-$CH_3$— | 4-CONH— | 3,4-di-Cl—phenyl- | greenish yellow |
| 29 | 4-$NH_2$—2-$CH_3$— | 4-Cl—3-CONH— | 2,4-di-Cl—phenyl- | yellow |
| 30 | 4-$NH_2$—2-$CH_3$— | 4-Cl—3-CONH— | 2,4,5-tri-Cl—phenyl | orange |
| 31 | 4-$NH_2$—2-$CH_3$— | 4-Cl—3-CONH— | 2-$CH_3$—3-Cl—phenyl- | yellow |
| 32 | 4-$NH_2$—2-$CH_3$— | 4-Cl—3-CONH— | 2-$CH_3$—5-Cl—phenyl- | orange |
| 33 | 4-$NH_2$—2,5-di-$CH_3$ | 4-Cl—3-CONH— | 2,4-di-Cl—phenyl- | yellow |
| 34 | 4-$NH_2$—2-$OCH_3$ | 4-CONH— | 3,4-di-Cl—phenyl- | orange |
| 35 | 4-$NH_2$—2-$OCH_3$— | 4-Cl—3-CONH— | 2,4-di-Cl—phenyl- | yellow |
| 36 | 4-$NH_2$—2-$OCH_3$— | 4-Cl—3-CONH— | 2,4,5-tri-Cl—phenyl- | orange |
| 37 | 4-$NH_2$—2-$OCH_3$— | 3-$CH_3$—4-CONH— | 4-Cl—phenyl- | yellow |
| 38 | 4-$NH_2$—2-$OCH_3$— | 4-Cl—3-CONH— | 2-$CH_3$—3-Cl—phenyl- | yellow |
| 39 | 4-$NH_2$—2-$OCH_3$— | 4-Cl—3-CONH— | 2-$CH_3$—5-Cl—phenyl- | yellow |
| 40 | 4-$NH_2$—2,5-di-$OCH_3$— | 4-CONH— | 3,4-di-Cl—phenyl- | brown |
| 41 | 4-$NH_2$—2,5-di-$OCH_3$— | 4-Cl—3-CONH— | 2,4-di-Cl—phenyl- | orange |
| 42 | 4-$NH_2$—2,5-di-$OCH_3$— | 4-Cl—3-CONH— | 2,4,5-tri-Cl—phenyl- | orange |
| 43 | 4-$NH_2$—2,5-di-$OCH_3$— | 3-$CH_3$—4-CONH— | 4-Cl—phenyl- | brown |
| 44 | 4-$NH_2$—2,5-di-$OC_2H_5$— | 4-Cl—3-CONH— | 2,4-di-Cl—phenyl- | brown |

EXAMPLE 45

When repeating the procedure of Example 1 a yellow pigment with similarly good properties is obtained by using 3,4,5,6-tetrabromo- instead of 3,4,5,6-tetrachloro-o-cyanobenzoic acid methyl ester.

EXAMPLE 46

A yellow pigment having similarly good properties when incorporated in plastics, printing pastes and lacquers is obtained by using equimolar amounts of 3,4,6-trichloro-5-methoxy-o-cyanobenzoic acid methyl ester instead of 3,4,5,6-tetrachloro-o-cyanobenzoic acid methyl ester and repeating the procedure of Example 1.

EXAMPLE 47

13.0 g of 3,4,5,6-tetrachlorocyanobenzoic acid methyl ester are stirred with 43.2 ml of a 1 N sodium methylate solution in methanol until a clear solution is obtained. Then 13.7 g of finely ground and sieved quinazol-4-on-6-yl-azo-acetoacetyl-p-aminoanilide, 150 ml of o-dichlorobenzene and 25 ml of dimethyl formamide are added and the procedure of Example 1 is repeated, affording 22.3 g of a yellow pigment which, after it has been ground by one of the conventional methods, can be used for incorporation in plastics, lacquers and printing inks. The colourations obtained are distinguished by high colour strength and good fastness to migration.

EXAMPLES 48–51

The procedure of Example 47 is repeated using, instead of 13.7 g of quinazol-4-on-6-yl-azo-acetoacetyl-p-aminoanilide, equimolar amounts of

| | |
|---|---|
| 48 | benzimidazolon-5-yl-azo-acetoacetyl-p-aminoanilide |
| 49 | 6-chlorobenzimidazolon-5-yl-azo-acetoacetyl-p-aminoanilide |
| 50 | 6-methylbenzimidazolon-5-yl-azo-acetoacetyl-p-aminoanilide |
| 51 | 4-methylquinol-2-on-7-yl-azo-acetoacetyl-p-amino- |

-continued anilide.

Yellow pigments with similarly good properties are obtained.

EXAMPLE 52

As described in Example 47, 13.0 g of 3,4,5,6-tetrachlorocyanobenzoic acid methyl ester are stirred into a solution of the sodium salt of 3,3-dimethoxy-4,5,6,7-tetrachloroisoindolin-1-one. Then 17.8 g of finely ground and sieved 4-(4'-chlorobenzoylamido)-phenylazo-acetoacetyl-2-chloro-4-aminoanilide and 200 ml of o-dichlorobenzene are added and, at a bath temperature of 120° C., the internal temperature is raised to 100° C. in the course of 1 hour while distilling off methanol, and kept thereat for 1 hour. After acidification with 15 ml of glacial acid, the temperature is kept for 2 hours at 140°–150° C. The insoluble pigment is collected by filtration at 120° C., washed with methanol, acetone and water and dried, affording 25 g of a yellow pigment which, in this form or after it has been ground by one of the conventional methods, is used for the preparation of lacquers and printing inks. The yellow colourations obtained are distinguished by excellent fastness properties.

In the following Examples 53 to 118, the 4-(4'-chlorobenzoylamido)-phenylazo-acetoacetyl-2-chloro-4-aminoanilide employed in Example 52 is replaced by compounds of the general formula

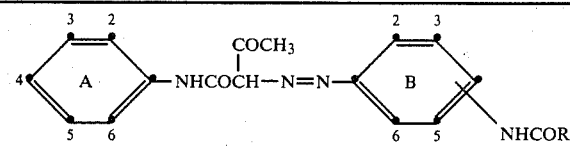

| No. | A | B | R | Shade |
|---|---|---|---|---|
| 53 | 3-NH$_2$— | 3-NH$_2$— | 4-Cl—phenyl- | greenish yellow |
| 54 | 3-NH$_2$— | 3-NH$_2$—6-CH$_3$— | 4-Cl—phenyl- | greenish yellow |
| 55 | 3-NH$_2$— | 4-NH$_2$— | 4-Cl—phenyl- | reddish yellow |
| 56 | 3-NH$_2$—6-Cl— | 4-NH$_2$— | 4-Cl—phenyl- | yellow |
| 57 | 3-NH$_2$— | 4-NH$_2$—3-CH$_3$— | 4-Cl—phenyl- | yellow |
| 58 | 3-NH$_2$— | 4-NH$_2$—2,5-di-OCH$_3$— | phenyl- | orange |
| 59 | 3-NH$_2$—6-CH$_3$— | 4-NH$_2$— | 4-chlorophenyl- | yellow |
| 60 | 3-NH$_2$— | 4-NH$_2$—2,5-di-Cl— | 4-chlorophenyl- | greenish yellow |
| 61 | 4-NH$_2$— | 3-NH$_2$— | —CH$_3$ | yellow |
| 62 | 4-NH$_2$— | 4-NH$_2$— | —CH$_3$ | yellow |
| 63 | 4-NH$_2$— | 4-NH$_2$—3-Cl— | —CH$_3$ | greenish yellow |
| 64 | 4-NH$_2$— | 4-NH$_2$—3-CH$_3$— | —CH$_3$ | yellow |
| 65 | 4-NH$_2$— | 4-NH$_2$—3-OCH$_3$— | —CH$_3$ | yellow |
| 66 | 4-NH$_2$—2-Cl— | 4-NH$_2$—3-Cl | —CH$_3$ | yellow |
| 67 | 4-NH$_2$—2-Cl— | 4-NH$_2$—3-CH$_3$— | —CH$_3$ | yellow |
| 68 | 4-NH$_2$—2-CH$_3$— | 4-NH$_2$—3-Cl— | —CH$_3$ | yellow |
| 69 | 4-NH$_2$—2-CH$_3$— | 4-NH$_2$—3-CH$_3$— | —CH$_3$ | yellow |
| 70 | 4-NH$_2$—2-CH$_3$— | 4-NH$_2$—3-OCH$_3$— | —CH$_3$ | yellow |
| 71 | 4-NH$_2$—2-OCH$_3$— | 4-NH$_2$—3-Cl— | —CH$_3$ | orange |
| 72 | 4-NH$_2$—2-OCH$_3$— | 4-NH$_2$—3-CH$_3$— | —CH$_3$ | orange |
| 73 | 4-NH$_2$—2-OCH$_3$— | 4-NH$_2$—3-OCH$_3$— | —CH$_3$ | orange |
| 74 | 4-NH$_2$— | 3-NH$_2$— | 4-chlorophenyl- | yellow |
| 75 | 4-NH$_2$— | 3-NH$_2$—6-Cl— | 4-chlorophenyl- | yellow |
| 76 | 4-NH$_2$— | 3-NH$_2$—6-CH$_3$— | 4-chlorophenyl- | yellow |
| 77 | 4-NH$_2$—2-Cl— | 3-NH$_2$— | 4-chlorophenyl- | yellow |
| 78 | 4-NH$_2$—2-Cl— | 3-NH$_2$—6-Cl— | 4-chlorophenyl- | yellow |
| 79 | 4-NH$_2$—2-Cl— | 3-NH$_2$—6-CH$_3$— | 4-chlorophenyl- | yellow |
| 80 | 4-NH$_2$—2-Cl— | 3-NH$_2$—4-CH$_3$— | 4-chlorophenyl- | yellow |
| 81 | 4-NH$_2$—2-CH$_3$— | 3-NH$_2$— | 4-chlorophenyl- | greenish yellow |
| 82 | 4-NH$_2$—2-CH$_3$— | 3-NH$_2$—6-Cl— | 4-chlorophenyl- | yellow |
| 83 | 4-NH$_2$—2-CH$_3$— | 3-NH$_2$—6-CH$_3$— | 4-chlorophenyl- | greenish yellow |
| 84 | 4-NH$_2$—2-CH$_3$— | 3-NH$_2$—4-CH$_3$— | 4-chlorophenyl- | greenish orange |
| 85 | 4-NH$_2$—2-OCH$_3$— | 3-NH$_2$— | 4-chlorophenyl- | yellow |
| 86 | 4-NH$_2$—2-OCH$_3$— | 3-NH$_2$—6-Cl— | 4-chlorophenyl- | orange |
| 87 | 4-NH$_2$—2-OCH$_3$— | 3-NH$_2$—4-CH$_3$— | 4-chlorophenyl- | orange |
| 88 | 4-NH$_2$—2,5-di-OCH$_3$— | 3-NH$_2$— | 4-chlorophenyl- | orange |
| 89 | 4-NH$_2$—2,5-di-OCH$_3$— | 3-NH$_2$—6-Cl— | 4-chlorophenyl- | red |
| 90 | 4-NH$_2$—2,5-di-OCH$_3$— | 3-NH$_2$—6-CH$_3$— | 4-chlorophenyl- | brown |
| 91 | 4-NH$_2$—2,5-di-OCH$_3$— | 3-NH$_2$—4-CH$_3$— | 4-chlorophenyl- | orange |
| 92 | 4-NH$_2$— | 4-NH$_2$— | 4-chlorophenyl- | yellow |
| 93 | 4-NH$_2$— | 4-NH$_2$— | 2,4-di-Cl—phenyl- | orange |
| 94 | 4-NH$_2$— | 4-NH$_2$—3-Cl— | 4-chlorophenyl- | yellow |
| 95 | 4-NH$_2$— | 4-NH$_2$—3-Cl— | 2,4-di-Cl—phenyl- | yellow |
| 96 | 4-NH$_2$— | 4-NH$_2$—2,5-di-Cl— | 4-chlorophenyl- | yellow |
| 97 | 4-NH$_2$— | 4-NH$_2$—3-CH$_3$— | 4-chlorophenyl- | greenish yellow |

-continued

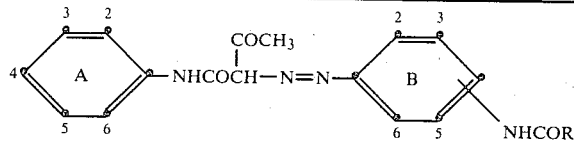

| No. | A | B | R | Shade |
|-----|---|---|---|-------|
| 98  | 4-NH$_2$— | 4-NH$_2$—2,5-di-OCH$_3$— | phenyl- | orange |
| 99  | 4-NH$_2$—2-Cl— | 4-NH$_2$— | 2,4-di-Cl—phenyl- | yellow |
| 100 | 4-NH$_2$—2-Cl— | 4-NH$_2$—3-Cl— | 4-chlorophenyl- | yellow |
| 101 | 4-NH$_2$—2-Cl— | 4-NH$_2$—3-Cl— | 4-chlorpophenyl- | yellow |
| 102 | 4-NH$_2$—2-Cl— | 4-NH$_2$—2,5-di-Cl— | 4-chlorophenyl- | yellow |
| 103 | 4-NH$_2$—2-Cl— | 4-NH$_2$—3-CH$_3$— | 4-chlorophenyl- | yellow |
| 104 | 4-NH$_2$—2-Cl— | 4-NH$_2$—3-OCH$_3$— | 4-chlorophenyl- | orange |
| 105 | 4-NH$_2$—2-CH$_3$— | 4-NH$_2$— | 4-chlorophenyl- | yellow |
| 106 | 4-NH$_2$—2-CH$_3$— | 4-NH$_2$—3-Cl— | 4-chlorophenyl- | yellow |
| 107 | 4-NH$_2$—2-CH$_3$— | 4-NH$_2$—2,5-di-Cl— | 4-chlorophenyl- | reddish yellow |
| 108 | 4-NH$_2$—2-CH$_3$— | 4-NH$_2$—3-CH$_3$— | 4-chlorophenyl- | yellow |
| 109 | 4-NH$_2$—2-CH$_3$— | 4-NH$_2$—3-OCH$_3$— | 4-chlorophenyl- | orange |
| 110 | 4-NH$_2$—2-OCH$_3$— | 4-NH$_2$—3-Cl— | 4-chlorophenyl- | orange |
| 111 | 4-NH$_2$—2-OCH$_3$— | 4-NH$_2$—2,5-di-Cl— | 4-chlorophenyl- | orange |
| 112 | 4-NH$_2$—OCH$_3$— | 4-NH$_2$—3-CH$_3$— | 4-chlorophenyl- | orange |
| 113 | 4-NH$_2$—2-OCH$_3$— | 4-NH$_2$—3-OCH$_3$— | 4-chlorophenyl- | yellow |
| 114 | 4-NH$_2$—2-OCH$_3$— | 4-NH$_2$—2,5-di-OC$_2$H$_5$— | phenyl- | orange |
| 115 | 4-NH$_2$—2,5-di-OCH$_3$— | 4-NH$_2$—3-Cl— | 4-chlorophenyl- | orange |
| 116 | 4-NH$_2$—2,5-di-OCH$_3$— | 4-NH$_2$—2,5-di-Cl— | 4-chlorophenyl- | red |
| 117 | 4-NH$_2$—2,5-di-OCH$_3$— | 4-NH$_2$—3-OCH$_3$— | 4-chlorophenyl- | red |
| 118 | 4-NH$_2$—2,5-di-OCH$_3$— | 4-NH$_2$—2,5-di-OCH$_3$— | phenyl- | red |

EXAMPLE 19

The procedure of Example 52 is repeated, using 13.7 g of 3,4-dichlorophenylazo-acetoacetyl-p-aminoanilide instead of 17.8 g of 4-(4'-chlorobenzoylamido)-phenylazo-acetoacetyl-2-chloro-4-aminoanilide. Yield: 22 g of a yellow pigment which can be used as obtained for the preparation of printing inks and lacquers. The colourations obtained therewith are distinguished by excellent fastness to light and atmospheric influences.

In the following Examples 120 to 139, the 3,4-dichlorophenylazo-acetoacetyl-p-aminoanilide employed in Example 119 is replaced by compounds of the general formula

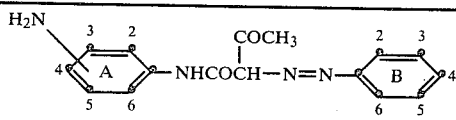

| No. | A | B | Shade |
|-----|---|---|-------|
| 120 | 3-NH$_2$— | 3,4-dichloro- | greenish yellow |
| 121 | 3-NH$_2$—6-chloro- | 3,4-dichloro- | greenish yellow |
| 122 | 4-NH$_2$— | 4-chloro- | yellow |
| 123 | 4-NH$_2$— | 2,4-dichloro- | yellow |
| 124 | 4-NH$_2$— | 2,4,5-trichloro- | yellow |
| 125 | 4-NH$_2$—2-chloro- | 4-chloro- | yellow |
| 126 | 4-NH$_2$—2-chloro- | 2,4-dichloro- | yellow |
| 127 | 4-NH$_2$—2-chloro- | 2,5-dichloro- | yellow |
| 128 | 4-NH$_2$—2-chloro- | 3,4-dichloro- | yellow |
| 129 | 4-NH$_2$—2-chloro- | 3-trifluoromethyl-4-chloro- | yellow |
| 130 | 4-NH$_2$—2-chloro- | 2,4,5-trichloro- | yellow |
| 131 | 4-NH$_2$—2-chloro- | 2,4,6-trichloro- | yellow |
| 132 | 4-NH$_2$—2-chloro- | 2,4-dimethyl- | yellow |
| 133 | 4-NH$_2$—2-chloro- | 2,5-dimethoxy-4-chloro- | orange |
| 134 | 4-NH$_2$—2-methyl- | 2,4-dichloro- | yellow |
| 135 | 4-NH$_2$—2-methyl- | 3,4-dichloro- | yellow |
| 136 | 4-NH$_2$—2-methyl | 2,4,5-trichloro- | orange |
| 137 | 4-NH$_2$—2-methoxy- | 2,5-dimethoxy-4-Cl— | reddish orange |

-continued

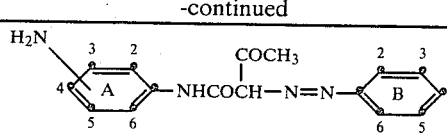

| No. | A | B | Shade |
|-----|---|---|-------|
| 138 | 4-NH$_2$—2,5-dimethoxy- | 4-chloro- | orange |
| 139 | 4-NH$_2$—2,5-dimethoxy- | 3,4-dichloro- | orange |

EXAMPLE 140

3.15 g of 3-chloro-4-[2',4'-dichlorobenzoyl]-amidoaniline are dissolved hot in 100 ml of glacial acetic acid and the chlorohydrate is precipitated with 3.5 ml of conc. hydrochloric acid. After cooling to 0°–5° C., diazotisation is effected with 2.5 ml of 4 N sodium nitrite solution.

4.6 g of 3-(4-acetoacetylamido-phenylimino)-1-oxo-4,5,6,7-tetrachloroisoindoline (prepared by reacting a fine suspension of 3-(4-aminophenylimino)-1-oxo-4,5,6,7-tetrachloroisoindoline in glacial acetic acid with diketene at 50°–55° C.) are dissolved in 100 ml of methanol with the addition of 2 ml of conc. sodium hydroxide. The solution is cooled with 100 g of ice and then 10 g of sodium acetate crystals are added. The above diazo solution is added to this solution and the resultant pigment suspension is heated to 70° C. and filtered. The filter cake is washed with methanol and water and dried in vacuo, affording 7.3 g of crude pigment. This product is stirred in 75 ml of o-dichlorobenzene for 2½ hours at 170°–175° C. The suspension is cooled to 120° C., filtered, and the filter cake is washed with methanol, acetone and hot water and dried in vacuo, affording 6.4 g of a yellow pigment which is identical with that of Example 95 and which can be used as obtained.

EXAMPLE 141

The procedure of Example 140 is repeated using 3.15 g of 3'-amino-4'-chlorobenzoyl-2,4-dichloroaniline instead of 3-chloro-4-[2',4'-dichlorobenzoyl]amidoaniline, affording 6 g of the same yellow pigment as described in Example 1.

EXAMPLES 142 AND 143

1.6 g of 2,4-dichloroaniline and 1.6 g of 3,4-dichloroaniline are diazotised in known manner and the procedure of Example 140 is repeated, affording 5.1 g and 6.4 g respectively of a yellow pigment having a constitution and properties identical to those of the pigment obtained in Examples 123 and 119 respectively.

EXAMPLE 144

2 g of the pigment obtained in Example 119 are ground with 36 g of toner dehydrate, 60 g of boiled linsed oil of medium viscosity and 2 g of cobalt linoleate on a three roll mill. The yellow prints obtained with the resultant colour paste are strong and of excellent light-fastness.

EXAMPLE 145

0.6 g of the pigment obtained in Example 1 is mixed with 67 g of polyvinyl chloride, 33 g of dioctyl phthalate, 2 g of dibutyl tin dilaurate and 2 g of titanium dioxide and the mixture is processed to a thin sheet for 15 minutes at 160° C. on a roll mill. The yellow colouration obtained is strong and fast to migration, heat and light.

EXAMPLE 146

10 g of titanium dioxide and 2 g of the pigment obtained in Example 52 are ground for 48 hours in a ball mill with 88 g of a mixture of 26.4 g of coconut alkyd resin, 24 g of melamine/formaldehyde resin (50% solids content), 8.8 g of ethylene glycol monomethyl ether and 28.8 g of xylene. The resultant lacquer is sprayed onto an aluminium sheet, predried for 30 minutes at room temperature and then stoved for 30 minutes at 120° C. The yellow finish obtained has excellent colour strength and very good fastness to overstripe bleeding, light and atmospheric influences.

What is claimed is:

1. An iminoisoindolinone pigment of the formula

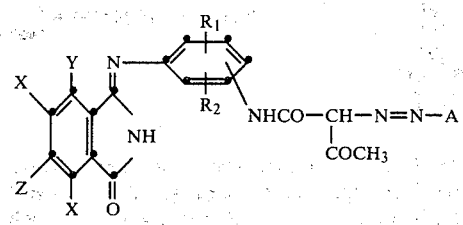

wherein X is halogen, Y and Z are halogen, $C_1$–$C_4$ alkoxy or aryloxy, $R_1$ and $R_2$ are hydrogen, halogen, $C_1$–$C_2$ alkyl or $C_1$–$C_2$ alkoxy, and A is phenyl; phenyl substituted by halogen, by trifluoromethyl, by $C_1$–$C_2$ alkyl, by $C_1$–$C_2$ alkoxy or by a group of the formula —$CONHR_3$ or —$NHCOR_4$, wherein $R_3$ is hydrogen, $C_1$–$C_2$ alkyl, phenyl or phenyl substituted by halogen, by methyl, by methoxy or by trifluoromethyl, and $R_4$ is $C_1$–$C_2$ alkyl, phenyl or phenyl substituted by halogen, by methyl or by methoxy; or A is benzimidazolonyl, N-methylbenzimidazolonyl, chlorobenzimidazolonyl, methylbenzimidazolonyl, methoxybenzimidazolonyl, phenmorpholonyl, 6-methylphenmorpholonyl, quinazolinyl, 2,4-dihydroxy-1,3-quinazolinyl, quinolonyl, methylquinolonyl or quinazolonyl.

2. A pigment according to claim 1 of the formula

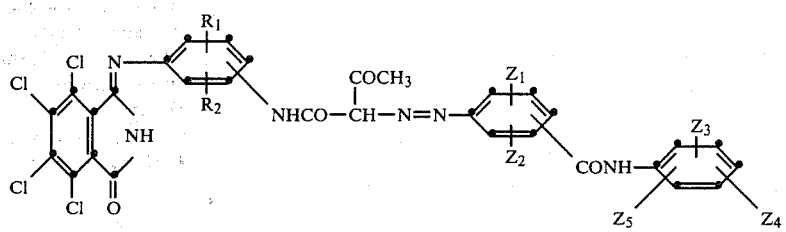

wherein $R_1$ and $R_2$ are hydrogen, halogen, $C_1$–$C_2$ alkyl or $C_1$–$C_2$ alkoxy, and $Z_1$ to $Z_5$ are hydrogen, halogen or methyl with the proviso that one of $Z_1$ and $Z_2$ is also methoxy and that not more than two of $Z_3$, $Z_4$ and $Z_5$ are also trifluoromethyl or methoxy.

3. A pigment according to claim 2 of the formula

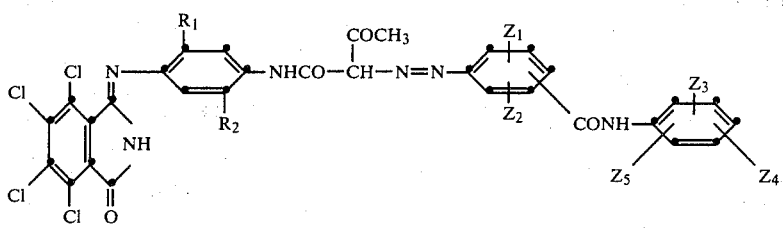

wherein $R_1$ and $R_2$ are hydrogen, halogen, $C_1$–$C_2$ alkyl or $C_1$–$C_2$ alkoxy, and $Z_1$ to $Z_5$ are hydrogen, halogen or methyl with the proviso that one of $Z_1$ and $Z_2$ is also methoxy and that not more than two of $Z_3$, $Z_4$ and $Z_5$ are also trifluoromethyl or methoxy.

4. An iminoisoindolinone pigment according to claim 1 of the formula

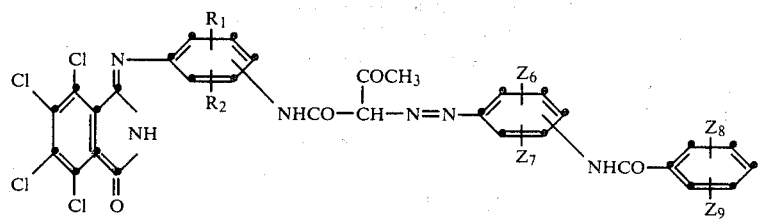

wherein $R_1$ and $R_2$ are as defined in claim 1, $Z_6$ and $Z_7$ are hydrogen, halogen, $C_1$-$C_2$alkyl, $C_1$-$C_2$alkoxy, and $Z_8$ and $Z_9$ are hydrogen, halogen, methyl or methoxy.

5. A pigment according to claim 3 of the formula

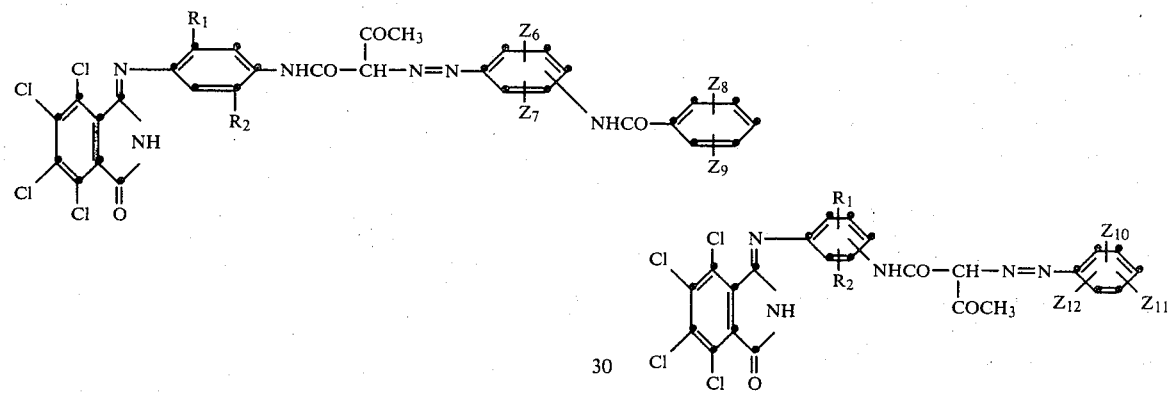

wherein $R_1$ and $R_2$ are hydrogen, halogen, $C_1$-$C_2$ alkyl or $C_1$-$C_2$ alkoxy, and $Z_6$ and $Z_7$ are hydrogen, halogen, $C_1$-$C_2$ alkyl or $C_1$-$C_2$ alkoxy, and $Z_8$ and $Z_9$ are hydrogen, halogen, methyl or methoxy.

6. An iminoisoindolinone pigment according to claim 1 of the formula wherein $R_1$ and $R_2$ are as defined in claim 1, and $Z_{10}$ to $Z_{12}$ are hydrogen, halogen, methyl, trifluoromethyl or methoxy, with the proviso that not more than two of the substituents $Z_{10}$ to $Z_{12}$ are trifluoromethyl or methoxy.

7. An iminoisoindolinone pigment according to claim 6 of the formula

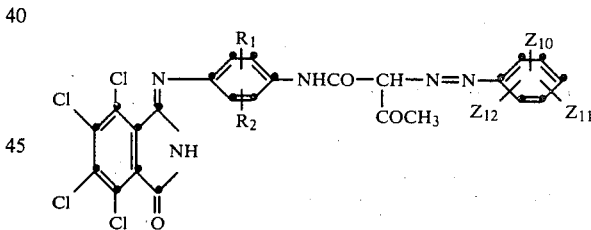

wherein $R_1$, $R_2$ and $Z_{10}$ to $Z_{12}$ are as defined in claim 6.

* * * * *